United States Patent Office 3,705,230
Patented Dec. 5, 1972

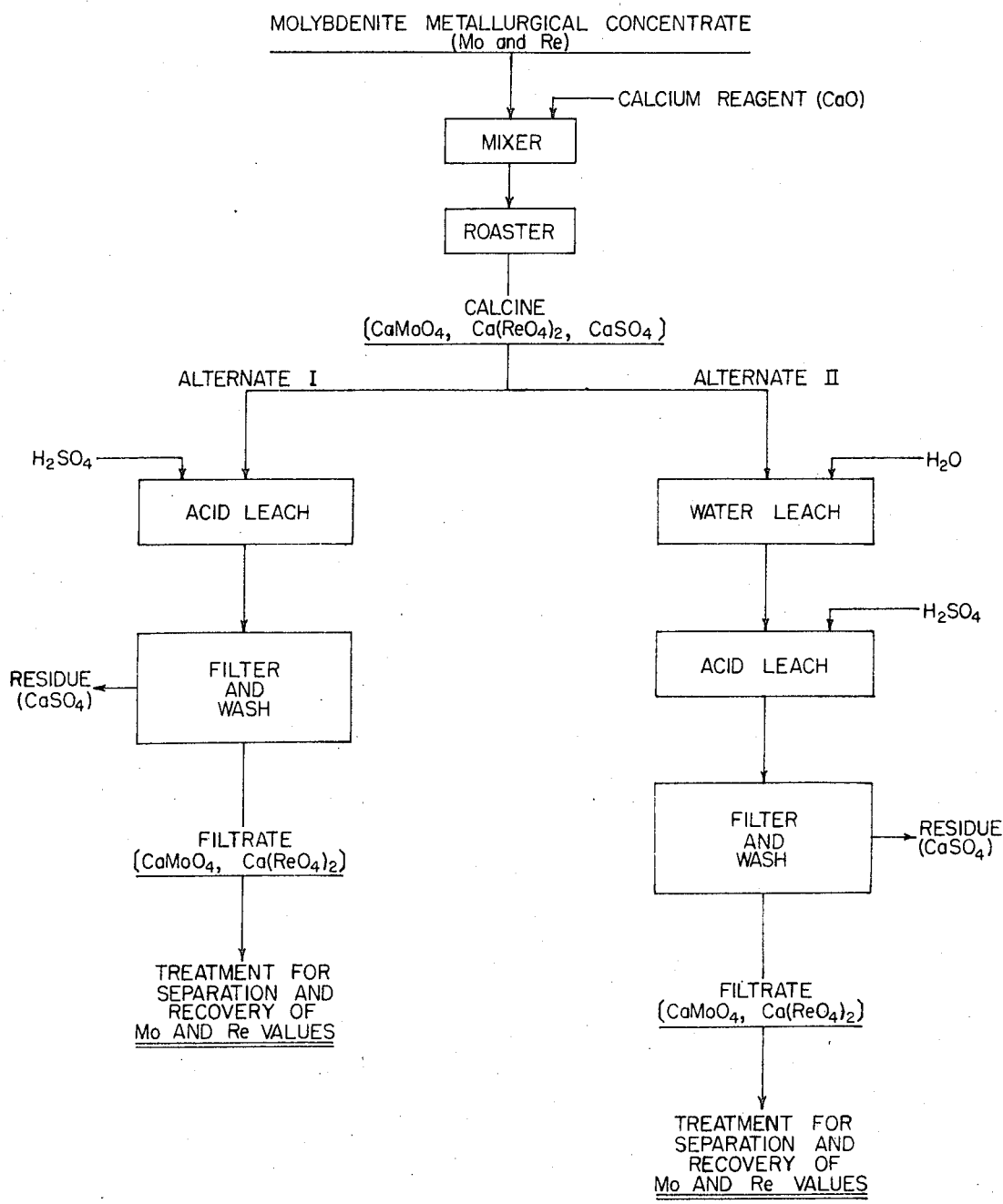

3,705,230
PROCESS FOR EXTRACTING MOLYBDENUM AND RHENIUM FROM RAW MATERIALS CONTAINING SAME
Jack M. Noy, Salt Lake City, Utah, assignor to Kennecott Copper Corporation, New York, N.Y.
Filed Dec. 28, 1970, Ser. No. 101,903
Int. Cl. C22b 59/00
U.S. Cl. 423—50
10 Claims

ABSTRACT OF THE DISCLOSURE

A process for extracting molybdenum and rhenium values from molybdenum and rhenium-bearing materials including the steps of roasting such a material in the presence of a calcium compound, such as burnt lime, CaO, to produce a calcine containing calcium molybdate, $CaMoO_4$, and calcium perrhenate, $Ca(ReO_4)_2$. The calcine is leached with acid at pH 1.0 or less, resulting in a solution containing dissolved molybdenum and rhenium values. Alternatively, the calcium calcine is leached with water, and the resulting slurry is subjected to leaching by acid. The solution is filtered and washed to remove insoluble residue and is then treated by means known in the art to separate and recover the molybdenum and rhenium values from the filtrate. Suitable recovery means include the use of extraction and stripping cells and ion exchange resins as described in U.S. Pat. No. 3,458,277 to Platzke, et al., and U.S. Pat. No. 2,876,065 to Zimmerley, et al.

BACKGROUND OF THE INVENTION

Field

This invention relates to a process for the extraction of molybdenum and rhenium values from materials containing same.

State of the art

Many processes are available for extracting and recovering molybdenum and rhenium values from molybdenum sulfide ores and concentrates which also contain small amounts of rhenium. Most of the processes either specifically or implicitly provide for the volatilization of the rhenium values during a roasting step in which the molybdenum and rhenium values are oxidized to a higher valence state. The rhenium is then recovered from the roaster gases and flue dust. As pointed out in U.S. Pat. No. 3,376,104 to Messner, et al., the calcining of molybdenite sulfide concentrates in the presence of a calcium reagent forms non-volatile calcium perrhenate and calcium molybdate which can then be treated for separation and recovery from the calcine. The techniques for separation which are taught by the Messner, et al., patent involve a number of separate steps, and require considerable time and expense to perform. According to the Messner, et al., disclosure, the calcine is first leached with water to dissolve the rhenium values in the calcine. The pregnant leach solution is separated from the remaining residue and processed for recovery of the rhenium. The residue containing undissolved calcium molybdate is then subjected to an acid leach to solubilize the molybdate values and the resulting solution pregnant with molybdate values is separated from the insoluble residue.

Objectives

It was an objective in the development of this invention to provide a more economical process having fewer process steps for extracting increased amounts of molybdenum and rhenium values from materials containing same, e.g., molybdenite concentrates and ores.

SUMMARY OF THE INVENTION

According to the invention, a material containing molybdenum and rhenium values, such as molybdenum-bearing sulfide ore or molybdenite metallurgical concentrate, is intimately mixed with a calcium reagent and roasted to form calcium molybdate and non-volatile calcium perrhenate. The calcium reagent can be any calcium-containing substance capable of reaction upon heating to form the desired calcium molybdate and calcium perrhenate. Calcium oxide, CaO, is preferred, because it inhibits substantially all volatilization of the rhenium values. The resulting product of the roasting step, which contains calcium sulfate, $CaSO_4$, in addition to the calcium molybdate, $CaMoO_4$, and calcium perrhenate, $Ca(ReO_4)_2$, is leached with an acid, preferably a mineral acid such as sulfuric, hydrochloric, or nitric acid, at a pH not higher than about pH 1.0 to dissolve the acid-soluble calcium molybdate and perrhenate salts. The leached residue is separated from the pregnant leach solution by filtration or other suitable means and is washed as necessary with an acidic wash solution. The filtrate contains the solubilized molybdenum and rhenium values, while the residue retains the calcium sulfate and other insoluble material. At this point, the acid filtrate can be treated to separate and recover the molybdenum and rhenium values according to methods for recovering these values from acid media. A preferred method for recovery is set forth in U.S. Pat. No. 3,458,277 to Platzke et al., in which the filtrate is extracted and stripped with an ammonium compound to form a concentrated solution of solubilized ammonium molybdate and ammonium perrhenate. The perrhenate is removed by ion exchange techniques, and the molybdate values are recovered by crystallization as ammonium paramolybdate followed by calcination to produce molybdic oxide, $MoO_3$.

As an alternative to the direct acid leaching of the calcine, such a calcine can be leached with water before subjecting the slurry containing the dissolved rhenium values and undissolved calcium molybdate to an acid leach at about pH 1.0 or below. Leaching with water solubilizes some of the perrhenate values contained in the calcine and also serves to activate the molybdate in the calcine to effect the dissolution of greater amounts of molybdate during the acid leaching step.

THE DRAWING

The best mode presently contemplated of carrying out the invention is illustrated in the accompanying drawing, in which the single figure is a flowsheet illustrating the process as applied to molybdenum sulfide concentrates containing rhenium values.

DETAILED DESCRIPTION OF PREFERRED EMBODIMENTS

As shown in the flowsheet, a molybdenite metallurgical concentrate containing molybdenum and rhenium values is intimately mixed with a calcium reagent and is roasted to produce a calcine containing calcium molybdate and perrhenate salts. Burnt lime, CaO, is preferred as the calcium reagent because it prevents the volatilization of virtually all rhenium in the concentrate. Other calcium-containing compounds, such as calcium hydroxide, calcium carbonate, and burned or hydrated dolomite, can be employed in the process, so long as they react with the molybdenum and rhenium values to produce the calcium salts thereof.

Molybdenum and rhenium-bearing materials other than molybdenite concentrates can also be processed in accordance with the invention. Such a material should be of suitable particle size for effective calcination in accordance with usual practice. The particle size prevailing in a molybdenite flotation concentrate is appropriate for the process.

The calcium reagent in a quantity in excess of the stoichiometric amount should be intimately mixed with the feed material to ensure complete reaction during roasting. Temperatures of from 500° C. to 900° C. can be employed for the roast. Such temperatures are considerably higher than normally used, since the presence of calcium prevents fusion of the concentrate. Inasmuch as the reactions are exothermic, the application of external heat is usually unnecessary, except to start the reaction.

The resulting calcination product contains a mixture of calcium molybdate and calcium perrhenate, along with varying amounts of other substances, such as calcium sulfate and minerals containing trace amounts of copper and iron. In one alternative embodiment, the calcine is leached directly with an acid solution having a pH of at most pH 1.0, with pH 0.8 being preferred, to solubilize the molybdate and perrhenate values. The pH can be as low as desired, but increasing concentrations of acid reduce the economies of the operation without adding appreciably to the recovery of molybdenum and rhenium values. The leaching can be conducted at ambient temperatures and for as long as is necessary to solubilize the molybdenum and rhenium values contained in the calcine. Assuming full recovery of the values is desired, the leaching will normally require at least four hours, with periods of 17 hours and more being not unusual. Mineral acids have been found to provide excellent service as leaching agents in the process. Sulfuric acid is preferred because of its availability and low cost, although hydrochloric, nitric, or other acids can also be utilized.

In an alternative embodiment of the invention shown in the flowsheet, the calcine containing calcium molybdate and perrhenate salts is subjected to leaching by water to produce a slurry comprising a solution containing dissolved rhenium values and undissolved calcium molybdate. The slurry is then leached with acid at about pH 1.0 or less, as noted above in the first alternative. The water leach can be performed at ambient temperatures and for a period of time sufficient to dissolve a substantial portion of the water-soluble calcium perrhenate. In addition to dissolving the perrhenate, the water leach activates the calcium molybdate to enable it to be solubilized more readily in the acid leach.

Following the acid leaching step in either alternative, the remaining insoluble material is separated as residue from the pregnant acid leach solution by filtration or other suitable means. If filtration is employed, the residue is preferably washed at least twice with wash water acidified to pH 1.0. Washing may be accomplished by conventional counter-current washing techniques. The filtrate containing the dissolved molybdate and perrhenate values can then be further processed to separate the two products and recover them from the acid filtrate.

Although any process suitable for recovering molybdenum and rhenium values from an acid medium can be employed, a preferred process for separating and recovering such values is taught in the Platzke et al., patent referred to above. According to the invention, the filtrate is processed through a series of solvent extraction cells to extract the molybdate and perrhenate values, leaving any other other solubilized mineral values, such as copper and iron, in the raffinate. The molybdenum and rhenium values are stripped from the pregnant solvent with an ammonium reagent, such as ammonium hydroxide, to produce a concentrate solution containing ammonium molybdate and perrhenate salts. At this point the solution can be processed through ion exchange resins to remove the rhenium values, as taught in the aforementioned Zimmerley, et al., patent, followed by crystallization and calcination of the molybdate to form high purity molybdic oxide, $MoO_3$. If desired, the last two steps can be reversed. The molybdate can be recovered first with the remaining concentrate solution being processed to recover the rhenium values.

The following examples are presented by way of illustration, and are not to be considered as limiting the scope of the invention:

EXAMPLE I

A molybdenite concentrate, containing 24.8 percent Mo, 0.098 percent Re, and 19.4 percent S, was blended with hydrated lime containing 90 percent $Ca(OH)_2$, in the ratio of one part molybdenite to 1.25 parts lime. One thousand grams of this mixture were calcined in a single hearth roaster with four rabble arms for 70 minutes at temperatures between 540° C. and 670° C. Two hundred forty grams of the calcine were leached at 20 percent solids in distilled water containing 83 grams of concentrated sulfuric acid. Leach time was four hours at pH 1.0, after which the material was filtered and washed with acidified water at pH 1.0. The material was then repulped twice with water at pH 1.0 with 20 percent solids for one-half hour each time, and was thereafter again washed. The resulting filtrate contained 0.057 g./l. rhenium and 10.5 g./l. molybdenum, with a rhenium loss in the residue of zero percent and a molybdenum loss in the residue of 2.0 percent. The volatilization loss of both metal values was 6½ percent.

EXAMPLE II

A molybdenite concentrate, containing 29.5 percent Mo, 0.055 percent Re, and 36.3 percent S, was mixed with 1.8 parts burnt lime (90% CaO) to one part concentrate. One thousand grams of this mixture were calcined in the same roaster used in Example I for 67 minutes at temperatures between 555° C. and 810° C. Two hundred forty grams of the calcine were leached at 13½ percent solids for 17 hours in distilled water containing 211 grams concentrated sulfuric acid at pH 1.0. The material was filtered and washed, was twice repulped for one-half hour each, and was again washed. All repulps and washings were at pH 1.0. The resulting filtrate contained 0.042 g./l. rhenium and 9.75 g./l. molybdenum. No molybdenum or rhenium was lost by volatilization during the roast. Losses in the final residue were 4½ percent for rhenium and 1.0 percent for molybdenum.

EXAMPLE III

A concentrate containing 43.8 percent molybdenum, 0.087 percent rhenium, and 38.1 percent sulfur was blended with burnt lime in a ratio of 1.8 parts burnt lime to 1.0 part concentrate. A 1200 gram charge was roasted in the same roaster for 65 minutes at temperatures between 505° C. and 830° C. One hundred eighty grams of this calcine were leached in distilled water at 30 percent solids for four hours, then immediately acidified with 165 grams concentrated sulfuric acid and distilled water at 13½ percent solids, and leached for four more hours at pH 0.8. The resulting slurry was filtered and washed, and the residue repulped twice for 30 minutes each and again washed. All repulps and washings were carried out at pH 0.8. The resulting filtrate contained 0.022 g./l. rhenium and 13.4 g./l. molybdenum. No rhenium or molybdenum was lost during the calcination Losses in the residue were 6 percent of the rhenium and ½ percent of the molybdenum.

Whereas this invention is illustrated and described herein with respect to certain preferred forms thereof, it is to be understood that many variations are possible without departing from the inventive concepts particularly pointed out in the claims.

What is claimed is:

1. A process for recovering molybdenum and rhenium values from a material containing said values, comprising the steps of roasting at a temperature of between about 500° C. and about 900° C. an intimate mixture of the material and a stoichiometric excess of a calcium-containing reagent capable of reacting with said molybdenum and rhenium values to produce a calcine containing calcium molybdate and calcium perrhenate;

subjecting the product of the roasting stage containing both the rhenium values and the molybdenum values to leaching by a mineral acid at a pH of about 1.0 or less, thereby producing a leach slurry containing dissolved molybdenum and rhenium values and an insoluble residue;

separating the insoluble residue and the solution containing the molybdenum and rhenium values; and separating the molybdenum values from the rhenium values.

2. A process as set forth in claim 1, wherein the acid is sulfuric acid and the calcium reagent is calcium oxide.

3. A process as set forth in claim 1, wherein the leaching is carried out at pH 0.8.

4. A process as set forth in claim 1, wherein separating the molybdenum values from the rhenium values is accomplished by extracting the solution containing the molybdenum and rhenium values with a solvent capable of dissolving molybdate and perrhenate values to remove impurities; stripping the solvent with an ammonium compound to form a solution containing ammonium molybdate and ammonium perrhenate values; crystallizing and separating ammonium paramolybdate from the solution; and subjecting the remaining solution to ion exchange techniques to remove the ammonium perrhenate from the solution.

5. A process as set forth in claim 4, wherein the ammonium perrhenate values are removed from the solution before the ammonium paramolybdate values are crystallized out of solution.

6. A process as set forth in claim 1, wherein the product of the roasting stage is leached with water to produce a slurry comprising a solution containing dissolved rhenium values and a water-insoluble residue containing molybdate values, before subjecting the slurry to the acid leaching step.

7. A process as set forth in claim 6, wherein the mineral acid is sulfuric acid and the calcium reagent is calcium oxide.

8. A process as set forth in claim 6, wherein the leaching is carried out at about pH 0.8.

9. A process as set forth in claim 6, wherein separating the molybdenum values from the rhenium values is accomplished by extracting the solution containing the molybdenum and rhenium values with a solvent capable of dissolving molybdate and perrhenate values to remove impurities; stripping the solvent with an ammonium compound to form a solution containing ammonium molybdate and ammonium perrhenate values; crystallizing and separating ammonium paramolybdate from the solution; and subjecting the remaining solution to ion exchange techniques to remove the ammonium perrhenate from the solution.

10. A process as set forth in claim 9, wherein the ammonium perrhenate values are removed from the solution before the ammonium paramolybdate values are crystallized out of solution.

References Cited

UNITED STATES PATENTS

| | | | |
|---|---|---|---|
| 3,458,277 | 7/1969 | Platzke et al. | 23—15 W |
| 3,376,104 | 4/1968 | Messner et al. | 23—15 W |
| 2,945,743 | 7/1960 | Zimmerley et al. | 23—19 RX |
| 3,455,677 | 7/1969 | Litz | 23—19 RX |

FOREIGN PATENTS

| | | | |
|---|---|---|---|
| 494,947 | 10/1938 | Great Britain | 23—15 W |

HERBERT T. CARTER, Primary Examiner

U.S. Cl. X.R.

423—54